(12) United States Patent
Otto et al.

(10) Patent No.: US 6,305,797 B1
(45) Date of Patent: Oct. 23, 2001

(54) ROTATING SHUTTER FOR EYE/OPTICS PROTECTION AGAINST IN-BAND FREQUENCY AGILE LASERS

(75) Inventors: William F. Otto, Huntsville; Vernon H. Ayre, Falkville; John K. Dempsey, Union Grove; Richard D. Milton, Lacey Spring, all of AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 07/253,100

(22) Filed: Sep. 26, 1988

(51) Int. Cl.$^7$ ...................................... G02B 26/02
(52) U.S. Cl. .................. 350/6.9; 89/1.11; 244/129.3; 244/121; 359/601
(58) Field of Search ..................... 350/271, 273, 350/274, 6.9; 351/46, 47, 163, 165; 359/234, 235; 89/1.11

(56) References Cited

U.S. PATENT DOCUMENTS

| | | | | |
|---|---|---|---|---|
| 2,538,769 | * | 1/1951 | Drake .................................... | 350/274 |
| 2,825,263 | * | 3/1958 | Dockhorn ............................. | 350/274 |
| 2,825,264 | * | 3/1958 | Dockhorn ............................. | 350/274 |
| 3,021,752 | * | 2/1962 | Avery .................................... | 350/274 |
| 4,044,756 | * | 8/1977 | Hamilton et al. ..................... | 350/273 |

* cited by examiner

Primary Examiner—Michael J. Carone
(74) Attorney, Agent, or Firm—Arthur H. Tischer; Freddie M. Bush

(57) ABSTRACT

A countermeasure device for the in-band frequency agile laser threat posed to the eyes of operator(s) comprises a rotating shutter operating at a predetermined speed and with alternating clear and nearly opaque sectors. The shutter is designed to spin in front of the operator's field of vision at a rate sufficient to avid a flickering image. The device significantly increases operator protection from an initial laser pulse over existing devices while allowing sufficient ambient light to reach the retina for clear vision. This device will eliminate dazzling which interferes with operator's ability to pinpoint the location of the laser source for neutralization. The device also eliminates the occurrence of damage to both eyes simultaneously.

4 Claims, 2 Drawing Sheets

ROTATING SHUTTER FOR EYE/OPTICS PROTECTION AGAINST IN-BAND FREQUENCY AGILE LASERS

CROSS-REFERENCE TO RELATED APPLICATION

The rotating shutter system disclosed in this application is disclosed in our concurrently filed U.S. Patent Application entitled: "Rotating Shutter System For Hostile Laser Source Location Technique", Ser. No.: 07/253099 Filed: Sep. 26, 1988.

BACKGROUND OF THE INVENTION

Optical filters have been designed that attenuate sufficiently at a particular wavelength thus leaving the rest of the visible spectrum open. Since the use of filters greater than optical density-2 (OD-2) limits the performance of pilot/operator in bright sunlight conditions, it follows that the use of OD-2 filters in a low ambient light scenario would likewise limit the performance for non-instrumental surveillance at the latter conditions. Bright light in the visible region (e.g., wavelength from about 397 micrometers or microns to about 723 micrometers or microns) and to the infrared region to the limit of perception of human eye (which is about 100 microns or 100 micrometers), emitting from a point source relates to radiation of a different nature than that which is emitting from a wide spectrum electromagnetic radiation source extending in many directions. Radiation from a point source such as radiation from a frequency agile laser is the subject matter which is covered in greater detail hereinbelow.

Laser radiation particularly in the visible region has always presented a potential hazard to the human eye. More recently this potential has been under exploitation by military organizations both foreign and domestic. The human eye focuses light in the visible region which greatly increases the intensity of light on the retina from that striking the cornea and the lens.

Certain laser beams are 10,000 times brighter than the sun's rays, and much more hazardous. When a beam of laser radiation is absorbed by living tissue, the extent of damage caused is dependent on several things: the energy level of the radiation, the type of tissue irradiated, and the wavelength of the laser radiation, and the time of exposure to the radiation.

Intense laser-energy when absorbed by the body is converted into heat. This heat coagulates the protein in the body's tissues (in a similar manner when boiling water coagulates egg albumin) and destroys the cells.

The human eye is the most vulnerable tissue to all types of laser radiation. The tissue in the retina (that portion of the eye upon which the light or image is focused, and specifically the fovea of the retina) is particularly susceptible to damage because the lens of the eyeball concentrates and focuses the laser beam on the fovea of the retina.

The interaction of a laser beam with eyeball tissue as received by the cornea and focused by the lens on the fovea of the retina is described as follows:

1. As the laser beam impinges on the eyeball, part of the beam is prevented from entering the eye by the iris, a colored disc behind the cornea (the outwardly convex transparent membrane forming part of the anterior outer coat of the eye); the iris acts like an automatic photographic shutter and constricts when high-intensity light impinges on the eye;

2. The shutter action of the iris prevents part of the light from reaching the retina;

3. The part of light which reaches the retina also affects a thin, dark-brown choroid membrane containing arteries, veins, and pigment cells which surrounds the retina. This membrane being dark colored can easily absorb this harmful radiation; hence, it must be protected;

4. The laser beam is converged and focused on the fovea of the retina by the lens; and, 5. As projected from laser-welding principles we know that the focus is the hottest point, therefore, the laser-energy density at the fovea (which is the focal point) is about $10^4$ to $10^6$ times more concentrated than that received by the cornea and the lens.

As concluded from the above described interactions, it is recognized why eye damage can occur due to this magnitude of light concentration.

Since the laser when used as a weapon against the human eye, eyes behind optics, and optics themselves is considered a threat to U.S. Forces, scientists have looked hard at countermeasure techniques. Protective goggles or glasses have been the only real product of research efforts. The bulk of the work has been in the types of filters to go in this eyewear.

Filters have been designed that attenuate sufficiently at a particular wavelength thus leaving the rest of the visible spectrum open. This is a real advantage to the pilots or operators in performing their tasks. With the advent of frequency agile lasers however, it has become necessary to filter over the entire visible region. This presents a real handicap to the operators in performing their tasks particularly in a low ambient light scenario.

Designing a filter in the form of goggles which filter over the entire visible region is not a practical approach. Another name for goggles which filter the complete visible spectrum is blindfolds. Thus, the limitation to an operator's performance is recognized, and it follows that instrument flight conditions would then be required; however, the ability to locate and pinpoint a source of light would be lost. Since OD-2 goggles pass $\frac{1}{100}$ of the light that strikes them which means that the agile laser threat could increase laser output by 100 times and thus negate the filters. Finally, the goggles allow for exposure of both eyes simultaneously. It follows that another approach is desired since complete protection of both eyes from a first laser pulse does not appear possible. Therefore, scientists had at this point in time shifted their emphasis from protection from the first laser pulse to a system designed towards providing protection from the second and subsequent laser pulses. The first pulse protection is not as essential to protect against since it appears that an operator will not be looking directly at the laser source when the first pulse arrives or that the first pulse will be off target but still detectable. This scheme also protects the operator from instinctively looking towards the source when the next pulse arrives.

The invention described hereinbelow takes another approach to solving the problem of providing eye/optics protection. This approach provides protection from laser pulses, including the first one, while also avoiding the risk of damage to both eyes simultaneously. The operator will also suffer no degradation of his performance due to insufficient light and should be able to pinpoint the hostile laser source location.

An object of this invention is to provide a device removeably, attachable to an operator's headgear which provides alternating clear and nearly opaque sections of a rotating shutter to provide eye protection while retaining visual acuity for operator.

A further object of this invention is to provide a rotating shutter having a predetermined ratio of open sectors to opaque sectors, predetermined sector size, and predetermined variable rotational speed to optimize maximum eye protection while retaining maximum visual acuity for an operator.

Still a further object of this invention is to provide a rotating shutter having the predetermined ratio number of open sectors to opaque sectors and predetermined rotational speed so that the rate of light reaching the retina of the operator achieves the critical flicker fusion frequency at low level illumination intensity of 5 to 6 flashes per second and at high level illumination intensity of up to 60 per second.

SUMMARY OF THE INVENTION

A rotatable shutter having alternating clear and nearly opaque sectors when operating in accordance with design criteria functions to countermeasure the in-band frequency agile laser threat posed to the eyes of operator(s). The shutter is rotated with a variable speed motor to provide the retina from about 5 to about 6 flashes of light a second at the low level illumination intensity and up to about 60 flashes of light per second at high illumination intensity. The rate of flashes of light are sufficient to avoid a flickering image when a clear or open sector passes in front of operator's field of view.

In operation, the invention increases an operator's protection to the initial laser pulse while allowing sufficient ambient light to reach the retina for clear vision. The invention device will eliminate dazzling to thereby allow the operator to pinpoint the location of an agile laser source. The arrangement of clear sectors in combination with the rotational speed eliminates the occurrence of damage to both eyes simultaneously.

The invention comprises a rotating shutter with alternating clear and nearly opaque sectors. The ratio of open sectors to opaque (or OD-4) sectors, sector size and motor speed is optimized with respect to several constraints. It is generally accepted that on the average an image presented 48 times per second to the human eye appears to be continuous. For a circular disk with three open sectors this would correspond to 16 rotations per second or 960 RPM. Another constraint is that adequate ambient light must reach the operator's eyes to allow clear vision. If the open sectors comprises 1% of the total disk area this corresponds to an OD-2 filter. Finally, the open sectors must be narrow enough and far enough apart to avoid simultaneous exposure of both eyes. If there were two openings each representing 1% of the disk area then at any given instant in time there would be a 4 in 100 chance of direct exposure to an eye (2 in 100 for each eye).

BRIEF DESCRIPTION OF THE DRAWING

FIG. 2 depicts a cylindrical configuration of a rotatable shutter system 20 of an alternate design for performing the function depicted and described in FIG. 1 while;

DESCRIPTION OF THE PREFERRED EMBODIMENT

Figure 2:
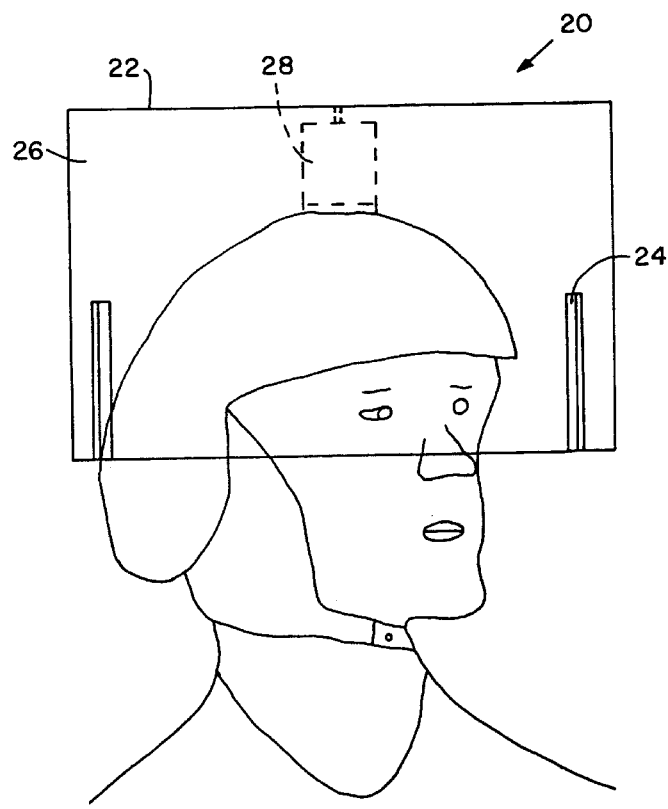
Figure 3:
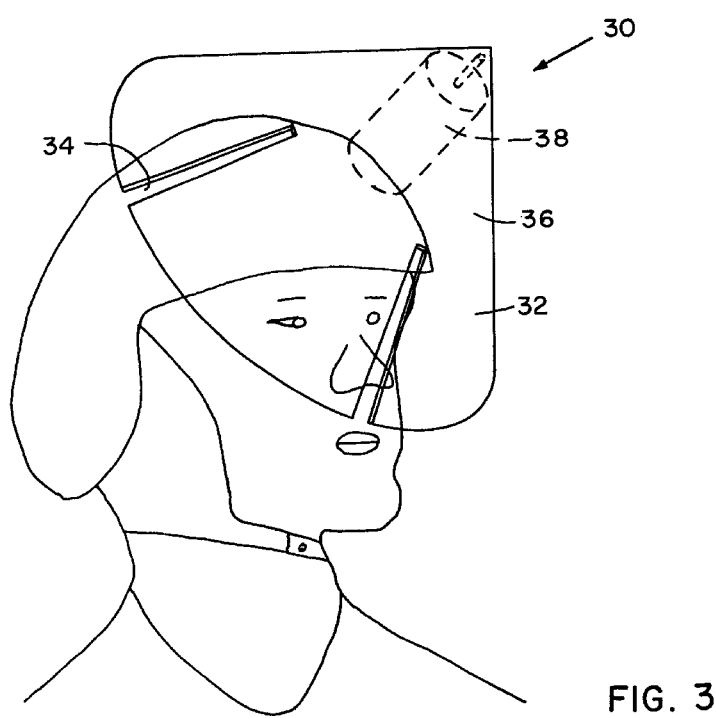
FIG. 3 depicts a conical configuration of a rotatable shutter system 30 of another alternate design for performing the function depicted and described in FIG. 1.

A rotatable shutter system designed as a countermeasure for blocking a laser beam radiating from an agile laser source. The alternate designs as depicted in FIGS. 1, 2 and 3 of the drawing illustrate a rotatable disk design of a shutter system 10, a rotatable cylindrical design of a shutter system 20, and a rotatable conical design of a shutter system 30, respectively.

Figure 1:
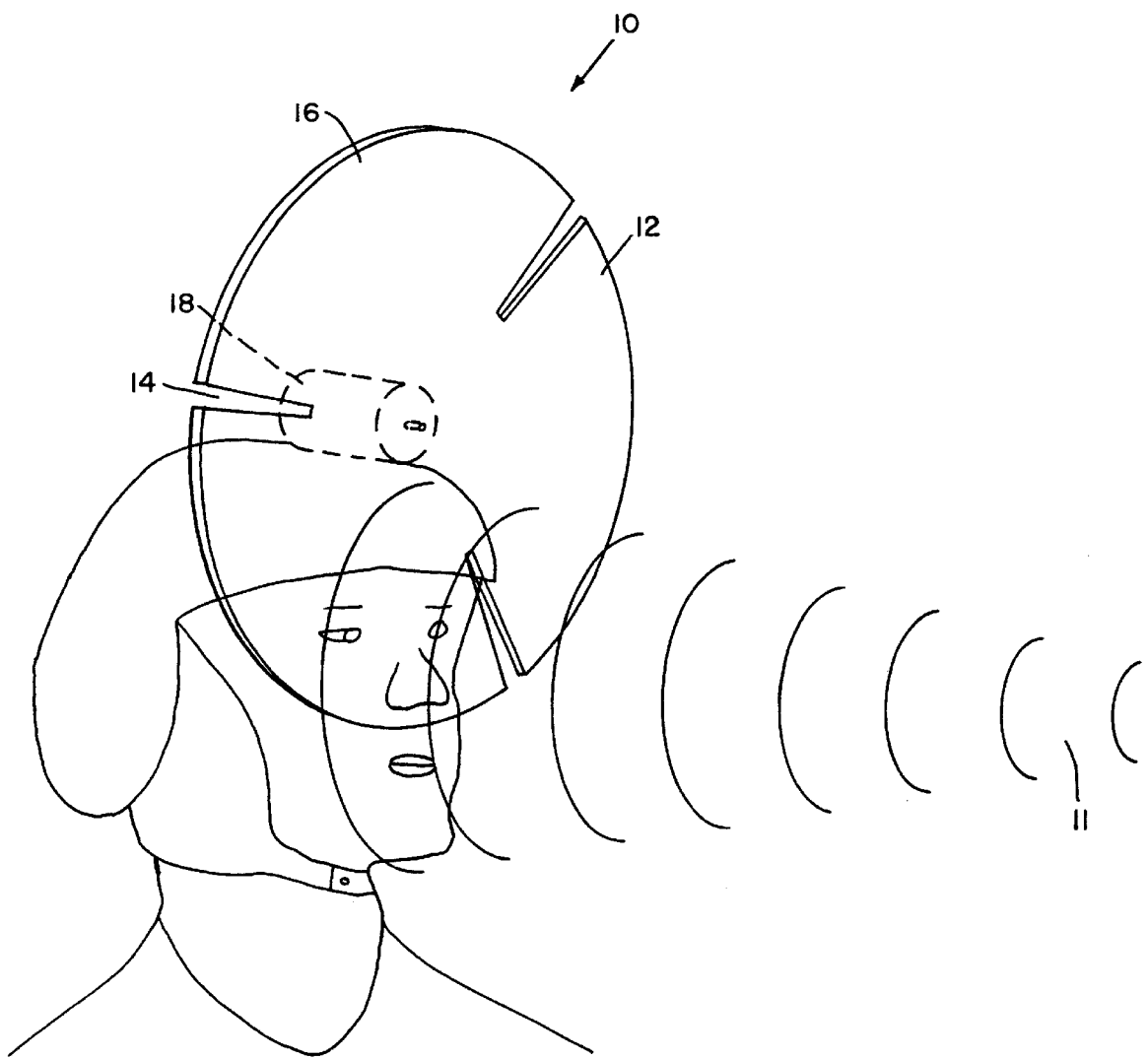
FIG. 1 of the drawing depicts a disk configuration of a shutter system 10 which is a countermeasure against an agile laser threat designed for rotating in front of an operator's field of vision at a rate sufficient to avoid a flickering image while allowing sufficient ambient light to reach the retina for clear vision.

In further reference to FIG. 1, a disk configuration of a shutter system 10 comprises a rotating shutter 12 depicting an alternate clear or low density sector 14, and an opaque or high density sector 16. The shutter disk is rotated in front of operator's field of vision by a removeably mounted, variable speed motor 18 at a sufficient rate to avoid a flicker image and while providing eye protection from an agile, hostile laser beam 11.

In operation, the hostile beam 11 will strike the opaque sector of the rotating disk in accordance with laws of probability rather than the clear sector and thereby protect the operator's eyes from direct exposure of the beam.

In a typical scenario the pilots would be in an attack run. The hostile laser beam will strike the shutter with a probability of not direct radiation to their eyes. The optical density of the nearly opaque sectors (nominal OD-4) is chosen so as to avoid damage and/or dazzle but yet still allow operator to have cognizance of the laser pulses. The operator can be able to pinpoint the laser source while retaining visual acuity for normal operation of aircraft with option of negating the source, turning away from it or continuing the attack mission. If the attacking option or a continuing of attack mission is chosen, then the chance for direct radiation through one of the shutter clear sectors does exist. The operator is provided a high probability of avoiding eye damage by using this invention device which increases his protection against the first pulse and against subsequent pulses as well.

Two other configurations of this device are shown in FIGS. 2 and 3. These include a cylindrical configuration 20 which allows for better peripheral vision and a conical configuration 30 which is more compact while still allowing good peripheral vision.

The associated similar parts of FIG. 2 for performing the functions as described for elements of FIG. 1 comprise rotating cylindrical shutter 22, open or clear sectors 24, opaque sectors 26, and a variable speed motor 28 for rotation of shutter at a predetermined rate. The associated similar parts of FIG. 3 for performing the functions as described for elements of FIG. 1 comprise rotating conical shutter 32, open sectors 34, opaque sectors 36, and a variable speed motor 38 for rotation of shutter at a predetermined rate. The hostile beam 11 illustrated in FIG. 1 is not shown in FIGS. 2 and 3 so as to not detract from the illustration for better peripheral vision of the cylindrical configuration 20 and from the illustratin for more compact feature while still allowing good peripheral vision of the conical configuration 30.

We claim:

1. A rotating shutter system for eye/optics protection against in-band frequency agile lasers, said rotating shutter system having a predetermined configuration and design selected from the group of configurations and designs consisting of a disk configuration, a cylindrical configuration, and a conical configuration, adaptable for mounting in combination with a headgear of an operator to permit said rotating shutter to spin in front of an operator's field of vision while providing alternating low optical density sectors which are narrow enough and far enough apart to avoid simultaneous exposure of both eyes and high optical density sectors for passing separately each eye of operator on an alternate schedule, said high optical density sectors permitting the blocking of laser pulses which are incidence upon the outer surface thereof, said low optical density sectors, allowing sufficient ambient light to reach the retina of an operator's eyes to retain visual acuity to locate a laser source, said rotating shutter system comprising:

(i) a rotatable shutter member having a major portion of high optical density material, said rotatable shutter having a predetermined number from 2 to 3 of low optical density sectors comprising from about 1% to about 2% of the total area of said rotating shutter member arranged in a predetermined position around the periphery of said rotatable shutter member for passing in front of the eyes of an operator to thereby allow sufficient ambient light to reach the retina of an operator's eye to provide visual acuity which enables the operator to locate said laser source;

(ii) removable, mounting means for securing said rotatable shutter to said headgear to permit rotational operation; and, (iii) a variable speed electrically operated motor removably mounted to said rotatable shutter for spinning said rotatable shutter at a predetermined rotational speed in front of an operator's field of vision.

2. The rotating shutter system for eye/optics protection against in-band frequency agile lasers as set forth in claim 1 wherein said rotatable shutter member is of a disk configuration, said predetermined number of clear or low optical density sectors consist of three equally spaced sectors which comprise about one percent of the total disk area, and wherein said rotatable shutter is rotated at a rate of 960 revolutions per minute to thereby allow sufficient ambient light to reach the retina of an operator's eye to retain visual acuity.

3. The rotating shutter system for eye/optics protection against in-band frequency agile lasers as set forth in claim 1 wherein said rotatable shutter member is of a cylindrical configuration, said predetermined number of clear or low optical density sectors consist of three equally spaced sectors which comprise about one percent of the total cylindrical area, and wherein said rotatable shutter is rotated at a rate of 960 revolutions per minute to thereby allow sufficient ambient light to reach the retina of an operator's eye to retain visual acuity.

4. The rotating shutter system for eye/optics protection against in-band frequency agile lasers as set forth in claim 1 wherein said rotatable shutter member is of a conical configuration, said predetermined number of clear or low optial density sectors consist of three equally spaced sectors which comprise about one percent of the total conical area, and wherein said rotatable shutter is rotated at a rate of 960 revolutions per minute to thereby allow sufficient ambient light to reach the retina of an operator's eye to retain visual acuity.

* * * * *